United States Patent [19]

Hochberg et al.

[11] Patent Number: 4,525,513
[45] Date of Patent: Jun. 25, 1985

[54] FLAME RETARDANT POLYAMIDE COMPOSITION

[75] Inventors: Arie Hochberg, Montclair; John C. Haylock, Sparta; Charles D. Mason, Chatham Township, Morris County, all of N.J.

[73] Assignee: Allied Corporation, Morris Township, Morris County, N.J.

[21] Appl. No.: 453,209

[22] Filed: Dec. 27, 1982

[51] Int. Cl.³ .............................................. C08K 5/10
[52] U.S. Cl. .................................. 524/288; 524/411; 524/412; 524/606; 525/426
[58] Field of Search ............... 524/288, 411, 412, 469, 524/471, 606; 525/426

[56] References Cited

U.S. PATENT DOCUMENTS

| | | | |
|---|---|---|---|
| 3,988,284 | 10/1976 | Wurmb et al. | 525/426 |
| 4,128,709 | 12/1978 | Vollkomer et al. | 525/169 |
| 4,137,212 | 1/1979 | Theyson et al. | 524/606 |
| 4,301,058 | 11/1981 | Neukirchen et al. | 525/288 |
| 4,373,049 | 2/1983 | Richardson | 524/375 |

*Primary Examiner*—Veronica P. Hoke
*Attorney, Agent, or Firm*—Richard A. Negin; Patrick L. Henry; Richard A. Anderson

[57] ABSTRACT

The present invention is a flame retardant composition comprising from 5 to 20 weight percent of a homopolymer of a monomer having the formula:

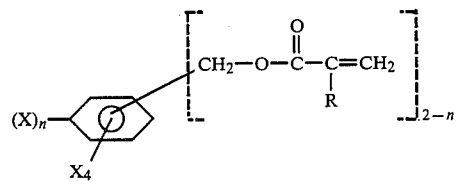

wherein $n=0$ or 1, X is bromine or chlorine and R is hydrogen or methyl. The polymer has a molecular weight between $1 \times 10^3$ and $10 \times 10^6$, and preferably $5 \times 10^3$ to $5 \times 10^6$. The molecular weight is determined by gel permeation chromatography in tetrahydrofuran. The composition contains from 80 to 95 weight percent of a polyamide. There can be from 0 to 10, preferably 1 to 10, and more preferably 2 to 6 weight percent of antimony oxide. Optionally, the composition can contain an impact modifier and/or a filler.

22 Claims, No Drawings

FLAME RETARDANT POLYAMIDE COMPOSITION

BACKGROUND OF THE INVENTION

This inventions relates to a flame retardant polyamide composition containing acrylate based polymers as flame retardants.

A wide variety of flame retardant additives for polyamides are available. However, many of the flame retardant materials are deleterious to the physical properties of polyamides. Typical of such materials are nonpolymeric materials which are nonsoluble in the polyamide matrix. These materials have been found to adversely affect the impact properties of polyamides.

Polymeric flame retardant type materials sold for use in thermoplastic materials have been found to be useful in a variety of polymers. However, these materials, although providing flame retardant properties, have often been found to be not compatible with polyamides. Typical of such materials is polymeric brominated polystyrene. This material has been found to be an effective flame retardant for polyamides. The use of polymeric brominated polystyrene to date has only been in glass filled polyamide compositions. The reason is that polymeric brominated polystyrene is not compatible with polyamides. It is necessary to use a dispersion aid such as short glass filler with the polymeric brominated polystyrene to uniformly distribute it throughout the polyamide matrix. Once this is done, it has been found to be an effective flame retardant.

Acrylate based flame retardant polymers are disclosed in U.S. Pat. Nos. 4,128,709 and 4,301,058, both hereby incorporated by reference. These disclosures disclose a variety of acrylate based polymers for use as flame retardant agents in thermoplastic compositions. Particularly disclosed is the use of pentabromobenzyl polyacrylate in a variety of polymers. However, neither patent discloses the use of such acrylate based polymers as flame retardants in polyamide compositions.

SUMMARY OF THE INVENTION

The present invention is a flame retardant composition comprising from 5 to 20 weight percent of a homopolymer of a monomer having the formula:

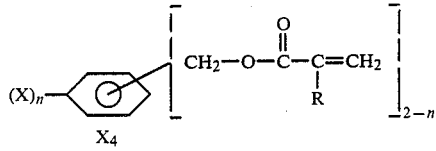

wherein $n=0$ or 1, X is bromine or chlorine and R is hydrogen or methyl. The polymer has a molecular weight between $1 \times 10^3$ and $10 \times 10^6$, and preferably $5 \times 10^3$ to $5 \times 10^6$. The molecular weight is determined by gel permeation chromatography in tetrahydrofuran. The composition contains from 80 to 95 weight percent of a polyamide. There can be from 0 to 10, preferably 1 to 10, and more preferably 2 to 6 weight percent of antimony oxide. Optionally, the composition can contain an impact modifier and/or a filler.

In a preferred composition, the polyamide is polyepsiloncaprolactam. The flame retardant is from 8 to 16 weight percent of the homopolymer of a monomer having the formula:

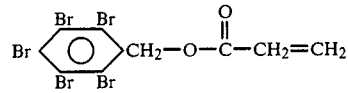

and further containing 2 to 6 weight percent of antimony oxide. Optionally, the composition can contain an impact modifier and/or a filler.

The present invention also includes a composition comprising a polyamide and up to 90 weight percent, preferably 1 to 90 weight percent, and more preferably 50 to 90 weight percent of the homopolyer described above. The composition contains a corresponding amount of polyamide and from 0 to 30 weight percent of antimony oxide in place of a corresponding amount of the homopolymer. This composition is particularly useful as a masterbatch for use in blending the homopolymer with polyamide.

The present invention includes an embodiment wherein the composition is an unfilled flame retardant polyamide composition.

The homopolymer and the polyamide used in the composition of the present invention have been found to be compatible. This is borne by the composition retaining tensile strength and improving in elongation compared to the composition using other organic hologen based flame retardants and without the homopolymers. Further, the composition of the present invention not only maintains impact resistance as compared to polyamide composition using other organic halogen based flame retardants and without the use of the homopolymer but the impact resistance actually improves.

DESCRIPTION OF THE PREFERRED EMBODIMENTS

The present invention is a flame retardant polyamide composition comprising a polyamide and acrylate based flame retardant polymer.

The term "polyamide" used in the present invention is intended to include long chain synthetic polymers which have regularly recurring amide groups as an integral part of the main polymer chain, and hence, includes amide-ester copolymers. Suitable polyamides can be prepared by polymerization of difunctional monomer or equivalently, its cyclized lactam (e.g., epsilon-aminocaproic acid or caprolactam, respectively) or by the reaction of a conjugate pair of monomers, for example, a diamide and a dicarboxylic acid (e.g., hexamethylenediamine and adipic acid), or a linear aminoaliphatic acid such as 11-amino undecanoic acid.

Suitable polycaprolactam can be produced by the polymerization of lactam monomers of the formula

where R is an alkylene group having from 3 to 12 or more carbon atoms, preferably from 5 to 12 carbon atoms. A preferred monomer is epsiloncaprolactam having 5 carbon atoms in the alkylene group. Lactam monomers in addition to epsiloncaprolactam include pyrollidone, piperodone, valerolactam, caprylactam, lauryllactam, etc. Also included are copolymers of two or more of the above or similar lactam monomers.

The homopolymer useful in the present invention is of the type disclosed in U.S. Pat. No. 4,138,709 hereby incorporated by reference. The homopolymer is formed from a monomer having the formula:

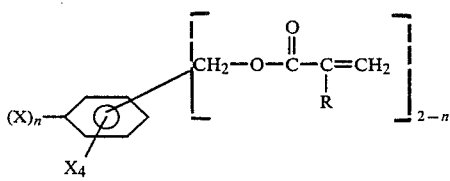

wherein n=0 or 1, X is bromine or chlorine and R is hydrogen or methyl. Preferably, n is equal to 1 and x is bromine. More preferably R is equal to H. The most preferred homopolymer is made from the monomer having the formula:

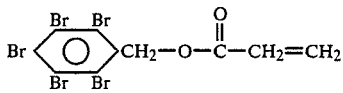

The homopolymer has a molecular weight between $1 \times 10^3$ and $10 \times 10^6$, and preferably from $5 \times 10^3$ to $5 \times 10^6$. The molecular weight values are determined as disclosed in U.S. Pat. No. 4,128,709. It is indicated that the molecular weight values given are those determined in accordance with a technique of Gel Permeation Chromatography and Solution Viscosity as published in B. Vollmert, "Goundriss der mackromoleku laren Chemie".

The composition of the present invention contains from 5 to 20 and preferably from 8 to 16 weight percent of the homopolymer, which is preferably pentabromobenzyl polyacrylate. The composition contains correspondingly 80 to 95 and preferably 84 to 92 weight percent of a polyamide which is preferably polyepsiloncaprolactam.

In the preferred composition of the present invention, there is from 0 to 10, preferably 1 to 10 and more preferably 2 to 6 weight percent of antimony oxide in place of a corresponding amount of polyamide.

The composition of the present invention can contain conventional additives such as stabilizers and inhibitors of oxidative, thermal and ultraviolet light degradation; lubricants and mold release agents, colorants, including dyes and pigments; fibrous and particulate fillers and reinforcements; nucleating agents; plasticizers; and impact modifiers; etc. Typical additives are disclosed in U.S. Pat. No. 4,174,358, hereby incorporated by reference.

The composition of the present invention can include polyamide impact modifiers known in the art. Included in those are ionic copolymers as disclosed in U.S. Pat. Nos. 3,264,272; 3,845,163; and 4,174,358 hereby incorporated by reference. Other useful impact modifiers include those disclosed in U.S. Pat. Nos. 3,472,916; 4,160,790; and 4,335,223 hereby incorporated by reference. These patents disclose various combinations of copolymers of alpha olefins with esters or acids with the optional addition of other ingredients such as metal oxides. There is preferably from 1 to 40 and more preferably from 2 to 15 weight percent of the impact modifier based on the weight of the polyamide.

The impact modifier can be a copolymer of an alphaolefin of the formula $RCH=CH_2$ where R is H or alkyl radicals having from 1 to 8 carbon atoms, and an alpha,beta-ethylenically unsaturated carboxylic acid having from 3 to 8 carbon atoms. The copolymer has from 0 to 100, preferably 10 to 100, and more preferably 50 to 100 percent of the carboxyl acid groups neutralized with metal ions. The cations of metals which are suitable in forming the ionic copolymers which can be used in the present invention can include mono-, di- and trivalent ions of metals and Groups I, II, III, IV-A and VIII of the Periodic Table of the Elements. Suitable monovalent cations include cations of sodium, potassium, lithium, cesium, silver, mercury, and copper. Suitable divalent cations include the cations of beryllium, magnesium, calcium, strontium, barium, copper, cadmium, mercury, tin, lead, iron, cobalt, nickel, and zinc. Suitable trivalent cations include the cations of aluminum, scandium, and iron. For the purposes of the composition of the present invention, the most preferred metal cation used to form the ionic copolymer is the cation of zinc.

Preferred copolymers of the present invention are copolymers of ethylene and an alpha,beta-ethylenically unsaturated carboxylic acid. Alpha,beta-ethylenically unsaturated carboxylic acids which can be polymerized with the ethylene include acrylic acid, methacrylic acid, itaconic acid, and ethacrylic acid. Further, the ionic copolymers can be terpolymers of the type described and used in U.S. Pat. No. 4,174,358.

Ester copolymers can be used as impact modifiers in the composition of the present invention such as the copolymer of ethylene and an ester selected from the group of alkyl esters of alpha,beta-ethylenically unsaturated carboxylic acids having 3 to 8 carbon atoms, wherein the alkyl group contains 1 to 4 carbon atoms. Examples of such esters include methyl, ethyl, propyl, isopropyl, butyl, isobutyl, and t-butyl esters of the carboxylic acids. The preferred esters are methacrylate, ethyl acrylate, and methyl methacrylate and ethyl methacrylate. More preferred are ethyl acrylate and ethyl methacrylate, with ethyl acrylate being the most preferred.

A preferred impact modifier is a combination of an ester copolymer and a copolymer of ethylene and an alpha, beta-ethylenically unsaturated carboxylic acid where there are from 0 to 100 percent of the carboxyl groups neutralized with metal ions as disclosed in U.S. Pat. Nos. 4,160,790 and 4,335,223. Other known impact modifiers useful in polyamides can be used, including but not limited to elastomeric impact modifiers such as EPDM elastomers.

Any suitable fillers can be used as are known in the art. The fillers may optionally be treated with various coupling agents or adhesion promotors as are known to those skilled in the art. Such fillers may be selected from a wide variety of minerals, metals, metal oxides, siliceous materials, metal salts and the like.

U.S. Pat. No. Re. 28,646, reissued Dec. 9, 1975, hereby incorporated by reference, discloses a list of fillers suitable for use in the composition of the present invention. Example of useful fillers include alumina, aluminum hydrates, felspar, asbestos, talc, calcium carbonates, clay, carbon black, quartz, novaculite and other forms of silica, kaolinite, garnet, mica, saponite, bentonite, calcium oxide, calcium hydroxide, metal silicates including calcium metasilicate, aluminum silicate, calcium magnesium silicates and an acicular aluminum silicate. Included in the fillers useful in the present invention are various forms of glass filler including microspheres short glass fibers and long glass fibers. A preferred filler is short glass fibers. There can be from 1 to 100 weight percent and preferably from 10 to 50 weight percent filler. Preferably, there is from 10 to 50 weight percent of short glass fibers as a filler when a filler is used.

The compositions of the present invention can be made on conventional mixing equipment. The various components can optionally first be physically blended and then combined on conventional melt blending equipment. Typical equipment includes Banbury internal mixers, mill mixing, extruders, or the like. Alternately, the blends may be made by solution blending or by dry mixing together of a component followed by melt fabrication of the dry mixture by extrusion or injection molding. In the case of injection molding of dry mixtures, screw preplasticization or other methods of giving good mixing should be employed. Preferably, the polyamide composition is melt blended in an extruder.

In an embodiment of the present invention the flame retardant homopolymer and optionally other ingredients including antimony oxide can first be made into a preblend or masterbatch. Such a masterbatch can be made on equipment including a Farrel continuous mixer or alternately on the type of mixing and melt blending equipment discussed above.

The present invention includes a composition suitable for use as a masterbatch. The composition comprises from 1 to 90 weight percent and preferably from 50 to 90 weight percent of a homopolymer of the monomor having the formula:

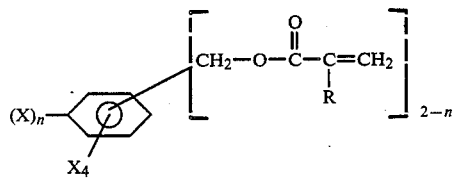

wherein n=0 or 1, X is bromine or chlorine and R is hydrogen or methyl. Preferably n is equal to 1, X is bromine and R is hydrogen. The homopolymer preferably has a molecular weight in the range of $1 \times 10^3$ and $10 \times 10^6$ and more preferably $5 \times 10^3$ to $5 \times 10^6$ as measured by gel permeation chromatography in tetra hydrofuran.

The masterbatch composition of the present invention can be combined with the polyamide and optionally the additional materials noted above to form the composition of the present invention.

Several examples are set forth below to illustrate the nature of the invention and the manner of carrying it out. However, the invention should not be considered as being limited to the details thereof. All percents are by weight unless otherwise indicated.

EXAMPLES 1-5

The compositions in the following examples were generally prepared by first dry blending the materials of each compositions. Each dry blended composition was fed into the hopper of a 2½ inch single screw extruder manufactured by the Egan Corporation. The average extruder temperature was about 500° F. and the extrudate was pelletized. Test samples were injection molded on a Battenfeld injection molding machine having a 75 ton clamp at about 500° F.

When a masterbatch was used, the masterbatch components were dry blended and fed into a Farrel continuous mixer followed by an Egan 2 inch single screw extruder operating at an average temperature of about 465° F. The masterbatch composition used contained 64 percent pentabromobenzyl polyacrylate, 16 percent antimony oxide ($Sb_2O_3$), 19 percent polyepsiloncaprolactam and 1 percent of powder polytetrafluoroethylene.

Tensile and elongation tests were conducted according to ASTM Procedure No. D-638 with a Type 2 specimen. Notched Izod impact resistance testing was conducted according to ASTM Test Procedure D-256. Flammability testing was conducted according to Underwriter's Laboratory Test Procedure UL94. According to this procedure a ¾ inch methane flame is applied for 10 seconds to the bottom of a vertical bar made of the sample which is 5 inches long, ½ inch wide and 1/32 inches thick. There is a dry absorbent surgical cotton cloth 12 inches below the bottom of the bar. If the sample competely burns it is given a rating of N.R.-no rating. If the sample self-extinguishes the flame is applied again for 10 seconds. This procedure is repeated for five bars of each sample. A sample is rated V-0 if: none of the five bars burns for more than 10 seconds after application of the flame; there cannot be a total flaming for greater than 50 seconds; and none of the samples melt resulting in a drip which ignites the cotton. A sample is rated V-1 if: none of the bars burn for greater than 30 seconds; total flaming of the samples does not exceed 250 seconds; and the cotton is not ignited. A sample is rated V-2 if: the sample burns within the time limits of a V-1 rated sample but the cotton ignites from molten drops of the sample. Drop weight impact was conducted according to ASTM Procedure D-2444 modified to use a base having a 4 inch outside diameter and a 3 inch inside diameter and a dart having a one inch tip diameter. The test discs were 4 inches in diameter and ⅛ inches thick.

The polyamide used was polyepsiloncaprolactam sold by Allied Corporation as Capron ™ 8207 and described in Capron Nylon Composite Data Sheet, bulletin 842-135 published February 1976 and hereby incorporated by reference. The melt index of Capron 8207 ™ is specified as being 3.5 to 5.0 grams/10 minutes according to ASTM D-1238 using a 1000 gram load at 235° C. The formic acid viscosity is 70 unless otherwise indicated.

The antimony oxide ($Sb_2O_3$) used in the following examples was Fire Shield ™ antimony oxide produced by PPG Industries, the antimony oxide used was H Grade having an average particle size of 1.0 to 1.8 μm. This material is described in PPG Industries bulletin Antimony Oxide, Bulletin No. A1339-800, hereby incorporated by reference.

The flame retardant used was pentabromobenzyl polyacrylate) (PBBPA). The material used was a white powder, 90% of which was between 70 and 200 μm. The bromine content was 70 to 71%. The melting range was 205° to 215° C. and the density was approximately 2.05 grams per cubic centimeter. The PBBPA used was obtained from Bromine Compounds Limited of Beer Sheva Israel.

EXAMPLE 1

A composition was prepared containing 10% by weight PBBPA, 2.5% by weight of antimony oxide, and 87.5% by weight of polyepsiloncaprolactam. Results are summarized in Table 1 below.

EXAMPLE 2

A composition was prepared by first making a masterbatch of PBBPA as described above, and polyepsiloncaprolactam having a formic acid viscosity of 45. The masterbatch contained 64% of PBBPA, 16% of antimony oxide, 19% of polyepsiloncaprolactam, and 1% of polytetrafluoroethylene powder. The polytetrafluoroethylene powder is sold as T-6 TM by the DuPont Company. The masterbatch was mixed with polyepsiloncaprolactam to form a composition having a total amount of PBBPA of 10% and a total amount of antimony oxide of 2.5%. Test results are summarized in Table 1 below.

EXAMPLE 3

A masterbatch was prepared using the Farrel continuous mixture and Egan 2 inch single screw at 500° F. The masterbatch contained 15.8% of ethylene acrylic acid copolymer (EAA) and 3.2% of ethyleneethylacrylate copolymers (EEA). The masterbatch had the same composition of the masterbatch in Example 2 with the exception that the polyepsiloncaprolactam used in Example 2 was replaced by the EAA/EEA mixture. The composition was prepared in the same manner as in Example 2 so that the total composition contained 10% of PBBPA and 2.5% of antimony oxide. The results are summarized in Table 1 below.

EXAMPLE 4

Example 1 was repeated except that 3% of the polyepsiloncaprolactam was replaced by 2.5% of EAA and 0.5% of EEA. The results are summarized in Table 1 below.

COMPARATIVE 1

A composition containing 100% polyepsiloncaprolactam was tested. This material had no rating (N.R.) when tested on the U.L. -94 test. This material is not flame retarded.

COMPARATIVE 2

A composition was prepared from 10% of SAY-TEX TM 93 ethylene-bis-tetrabromophthalimide described on SAYTEX flame retardant data sheet for SAYTEX TM BT-93 published by ethyl, Saytech, Inc. hereby incorporated by reference. Additionally, the composition contain 2.5% antimony oxide and 87.5% of polyepsiloncaprolactam both as described in Example 1. The results are summarized on Table 1 below.

COMPARATIVE 3

Comparative 3 is a poly(hexamethylene adipamide) (nylon 6,6) composition of 73.8% by weight of nylon 6,6; 0.2% of antimony oxide ($Sb_2O_3$), 14% of $ZnFe_2O_4$, and 12% of Dechlorane Phis. Dechlorane Phis is $C_{18}H_{12}Cl_{12}$ produced by Hooker Corporation and described in Material Safety Data Sheet for HCC substance No. SCD-984 dated January 1981 and hereby incorporated by reference.

TABLE 1

| | Tensile Str (psi) | Elong (%) | Notched Izod (in-lbs/in) | Drop Wt. Impact (ft.lbs.) | UL-94 (1/32" bar) |
|---|---|---|---|---|---|
| Ex 1 | 12400 | 50 | 1.1 | 30 | V-0 |

TABLE 1-continued

| | Tensile Str (psi) | Elong (%) | Notched Izod (in-lbs/in) | Drop Wt. Impact (ft.lbs.) | UL-94 (1/32" bar) |
|---|---|---|---|---|---|
| Ex 2 | 12400 | 90 | 1.2 | 70 | V-0 |
| Ex 3 | 11200 | 200 | 1.4 | 70 | V-0 |
| Ex 4 | 11700 | 75 | 1.2 | 45 | V-2 |
| Comp 1 | 12300 | 150 | 1.2 | 120 | N.R. |
| Comp 2 | 12200 | 10 | 0.70 | 3 | V-0 |
| Comp 3 | 10600 | 15 | 0.80 | 4 | V-0 |

The composition of the present invention as disclosed in Examples 1–4 provides flame retardant properties with little or no drop in impact properties and tensile strength. Physical properties are particularly good when PBBPA is used in matchbatch form resulting in improved dispersion. In all cases using the PBBPA, the elongation, an indication of compatibility is relatively high. This can be seen when comparing the results of commonly used halogenated flame retardants and polyamides as indicated in Comparatives 2 and 3. In Comparative 3, a chlorine base organic flame retardant was used and in Comparative 2 a bromine based organic flame retardant was used. In both cases, the elongation was significantly reduced when compared to Comparative 1 a polyamide (nylon 6) having no flame retardant control. The flame retardant composition of the present invention has satisfactory impact, and elongation. Additionally, it is noted that the flame retardant PBBPA has found to be exceptionally compatible with polyamides. The processed material appears uniform and smooth. The surface is shiny and there is no phase separation. This is particularly noticed upon extrusion of strings for pelletizing. Noncompatible materials used as flame retardants could not be extruded into such strings. The strings do not have sufficient strength to be self supporting between the extruder and the cooling baths with noncompatible flame retardants.

Of particular interest are the drop weight impact values showing that the composition containing PPBPA maintains a significant amount of drop weight impact resistance when compared with a brominated organic material. This is particularly evident in masterbatches. The composition of the present invention has been found to be extremely compatible with polyamides, particularly with polyepsiloncaprolactam. Further, the composition is blended as a melt with the polyepsiloncaprolactam resulting in excellent dispersion even when not used in masterbatch form. This is particularly important considering the fact that other polymeric flame retardants such as PYRO CHECK 68-PB, a polymeric brominated styrene made by Ferro Corp., for example, has been found to be extremely incompatible with polyamide although it is compatible with other polymeric material such as polyethylene terephthalate.

EXAMPLE 5

The composition of this example contained 14% of PPBPA and 3.5% of antimony oxide. The composition contained 30% of short glass fibers and 52.5 of polyepsiloncaprolactam of the type used in Example 1. The results are summarized in Table 2 below.

COMPARATIVE 4

The composition contained 30% by weight or short glass fibers and 70% by weight of polyepsiloncaprolactam as described in Example 1. Results are summarized in Table 2 below.

COMPARATIVE 5

The composition contained 12% SAYTEX BT-93 of the type used in Comparative 2 and 3% of antimony oxide. There was 30% of chopped glass fiber and 55% of polyepsiloncaprolactam as used in Example 1. Results are summarized in Table 2 below.

COMPARATIVE 6

This composition contained 48% of poly (hexamethyleneadipamide) (nylon 6,6), 24.3% of PYRO CHECK TM 68B, polymeric bominated polystyrene made by Ferro Corporation. The PYRO CHECK has a softening point of 235° C. The composition contained 3.8% of antimony oxide and 24% of short glass fibers. Results are summarized in Table 2 below.

TABLE 2

|  | Tensile Str (psi) | Unnotched Izod (in lbs/in) | UL-94 (1/32" bar) |
|---|---|---|---|
| Ex 5 | 27400 | 27 | V-0 |
| Comp 4 | 27000 | 28 | N.R. |
| Comp 5 | 23700 | 23 | V-0 |
| Comp 6 | 24000 | 18 | V-0 |

The results show that the flame retardant composition of the present invention maintains both tensile strength and unnotched izod impact strength values compared to a nylon composition without flame retardant control or a nylon composition using a flame retardant brominated organic hydrocarbon compound. Here again, the compatability between PBBPA and polyepsiloncaprolactam resulted in a composition which maintained physical properties including impact values.

EXAMPLE 6

A polyamide composition was prepared which contained PBBPA and an impact modifier. A high impact polyepsiloncaprolactam composition was melt blended using a 2½ inch diameter, 24 L/D single screw extruder at a temperature range of 475° to 500° F. The high impact composition contained 71.55 percent of polyepsiloncaprolactam having a formic acid viscosity (FAV) of 70. It containted 4.0 percent of ethylene ethyl acrylate manufactured by Union Carbide as Bakelite Flexible Ethylene Copolymer DPD 6169, and described as having a melt index of 6 grams/10 minutes and an ethyl acrylate content of 18 weight percent (about 5.8 mol percent). The high impact composition contained 24 percent of a zinc neutralized copolymer of ethylene and methacrylic acid sold by the DuPont Company as Surlyn ® 1801 and described as having a melt index of 1.0 decigram per minute (ASTM D 1238). Additionally, 0.20 percent of magnesium oxide and 0.25 percent zinc stearate were added.

A masterbatch containing 63 percent of PBBPA as described in Examples 1-5 was prepared using a LNP Columbo Co. of Torino, Italy, Model No. RC-2, 2-inch corotating twin screw extruder at 450° F. The masterbatch contained 20 percent of polyepsiloncaprolactam having a FAV of about 135. The masterbatch also contained 16 percent of antimony oxide and one percent of T-6 TM polytetrafluoroethylene powder.

A composition using 72 percent of the high impact polyepsiloncaprolactam composition and 28 percent of the masterbatch was melt blended on an NRM 2½ inch single screw extruder at 475° F. to 500° F. The composition had a melt index of 0.36 grams/10 minutes (ASTM D-238) and a notch Izod impact value of 11.4 ft-lbs/inch of notch (ASTM D-256).

EXAMPLE 7

A composition was prepared using the high impact polyepsiloncaprolactam composition as described in Example 6. A masterbatch containing 20.6 percent of the high impact polyepsiloncaprolactam composition, 63 percent of PBBPA, 16 percent antimony oxide, and 0.35 percent of T-6 TM polytetrafluoroethylene of the type used in Example 6 was made according to the procedure to make the masterbatch in Example 6. The composition contained 35 percent of the masterbatch and 65 percent of the high impact polyepsiloncaprolactam composition. The composition was tested according to procedures set forth in Examples 1-6. The melt index was 0.83, the notched Izod impact resistance was 3.0, and the UL-94 (4 bars were V-0 and 1 bar was V-2).

While exemplary embodiments of the invention have been described, the true scope of the invention is to be determined from the following claims:

What is claimed is:

1. A composition comprising: from 5 to 20 weight percent of a homopolymer of a monomer having the formula

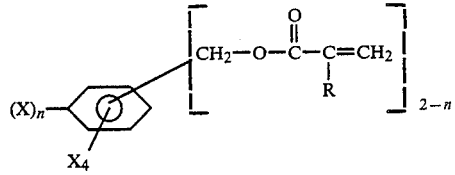

wherein
n=0 or 1, X is bromine or chlorine and R is hydrogen or methyl, said polymer having a molecular weight between $1 \times 10^3$ and $10 \times 10^6$, said molecular weight determined by gel permeation chromatography in tetrahydrofuran;
from 80 to 95 weight percent of a polyamide; and
from 0 to 10 weight percent of antimony oxide in place of a corresponding amount of polyamide.

2. The composition as recited in claim 1 wherein n=1 and X is bromine.

3. The composition as recited in claim 2 wherein the molecular weight is between $5 \times 10^3$ to $5 \times 10^6$.

4. The composition as recited in claim 2 wherein R is H.

5. The composition as recited in claim 4 wherein there is from 8 to 16 weight percent of the homopolymer of a monomer having the formula

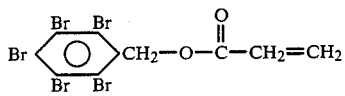

6. The composition as recited in claim 5 further comprising from 1 to 10 weight percent of antimony oxide in place of a corresponding amount of polyamide.

7. The composition as recited in claim 6 wherein there is from 2 to 6 weight percent of antimony oxide.

8. The composition as recited in claim 1 further comprising from 1 to 40 percent based on the weight of the polyamide of an impact modifier.

9. The composition as recited in claim 1 further comprising a filler.

10. The composition as recited in claim 1 wherein the filler is short glass fibers.

11. The composition as recited in claim 1 wherein the polyamide is polyepsiloncaprolactam.

12. A composition comprising: from 5 to 20 weight percent of a homopolymer of a monomer having the formula

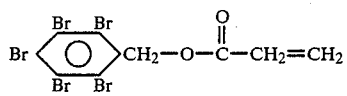

said polymer having a molecular weight between $1 \times 10^3$ and $10 \times 10^6$, said molecular weight determined by gel permeation chromatography in tetrahydrofuran and from 80 to 95 weight percent of polyepsiloncaprolactam.

13. The composition as recited in claim 12 further comprising from 1 to 10 weight percent of antimony oxide in place of a corresponding amount of antimony oxide.

14. The composition as recited in claim 12 further comprising from 1 to 50 weight percent of a filler in place of a corresponding amount of polyepsiloncaprolactam.

15. The composition as recited in claim 14 wherein the filler is short glass fibers.

16. The composition as recited in claim 14 further comprising from 1 to 40 percent based on the weight of the polyepsiloncaprolactam of an impact modifier.

17. A composition comprising from 1 to 90 weight percent of homopolymer of a monomer having the formula

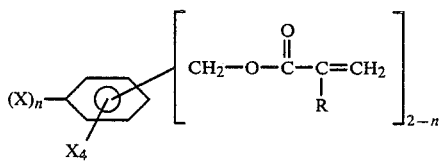

wherein
n=0 or 1, X is bromine or chlorine, R is hydrogen or methyl, said polymer having a molecular weight between $1 \times 10^3$ and $10 \times 10^6$, said molecular weight determined by gel permeation chromatography in tetrahydrofuran;
from 10 to 99 weight percent of a polyamide; and
from 0 to 30 weight percent of antimony oxide in place of a corresponding amount of the homopolymer.

18. The composition as recited in claim 17 wherein there is from 50 to 90 percent of the homopolymer, from 10 to 50 percent of polyamide; and from 0 to 30 weight percent of antimony oxide in place of a corresponding amount of the homopolymer.

19. The composition of claim 1 containing no filler.

20. The composition as recited in claim 19 wherein n=1, X is bromine and R is H.

21. A composition consisting essentially of: from 5 to 20 weight percent of a homopolymer of a monomer having the formula

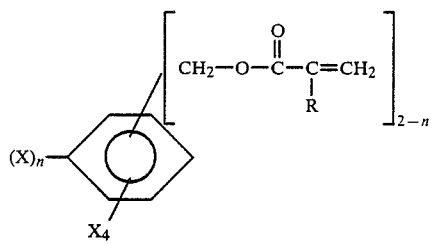

wherein
n=0 or 1, X is bromine or chlorine and R is hydrogen or methyl, said polymer having a molecular weight between $1 \times 10^3$ and $10 \times 10^6$, said molecular weight determined by gel permeation chromatography in tetrahydrofuran;
from 80 to 95 weight percent of a polyamide; and
from 0 to 10 weight percent of anitmony oxide in place of a corresponding amount of polyamide.

22. A composition consisting essentially of: from 1 to 90 weight percent of homopolymer of a monomer having the formula

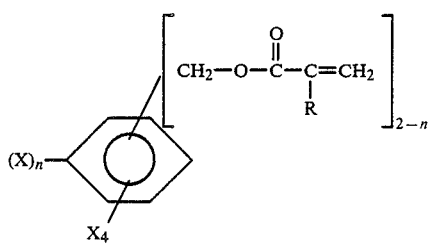

wherein
n=0 or 1, X is bromine or chlorine, R is hydrogen or methyl, said polymer having a molecular weight between $1 \times 10^3$ and $10 \times 10^6$, said molecular weight determined by gel permeation chromatography in tetrahydrofuran;
from 10 to 99 weight percent of a polyamide; and
from 0 to 30 weight percent of antimony oxide in place of a corresponding amount of the homopolyer.

* * * * *